March 2, 1937.  B. R. WELLINGTON  2,072,286
PROJECTING DEVICE
Filed Dec. 7, 1935   2 Sheets-Sheet 1
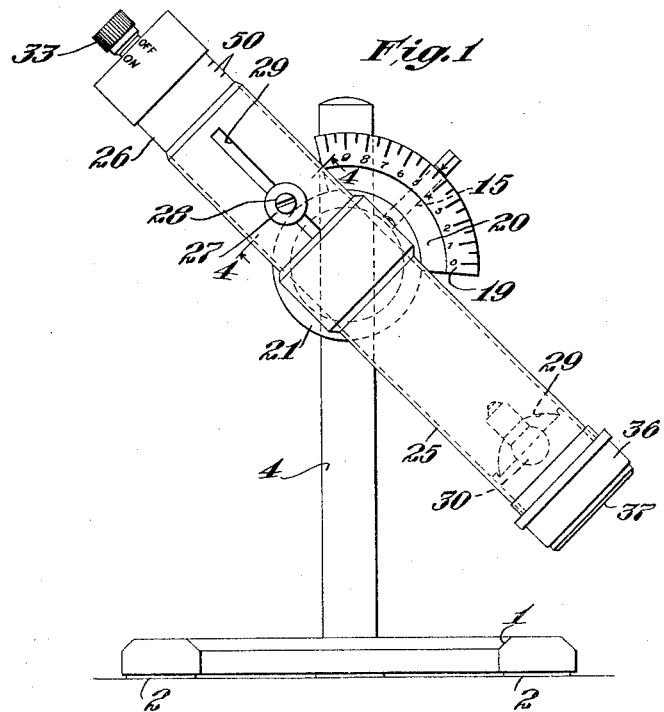
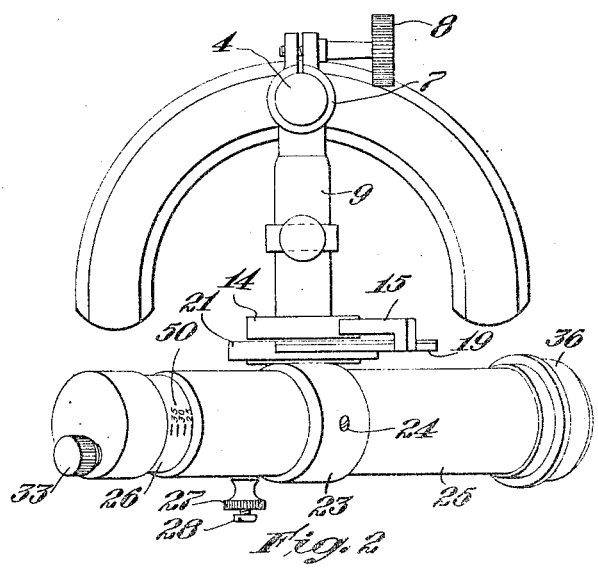

March 2, 1937.    B. R. WELLINGTON    2,072,286
PROJECTING DEVICE
Filed Dec. 7, 1935    2 Sheets-Sheet 2
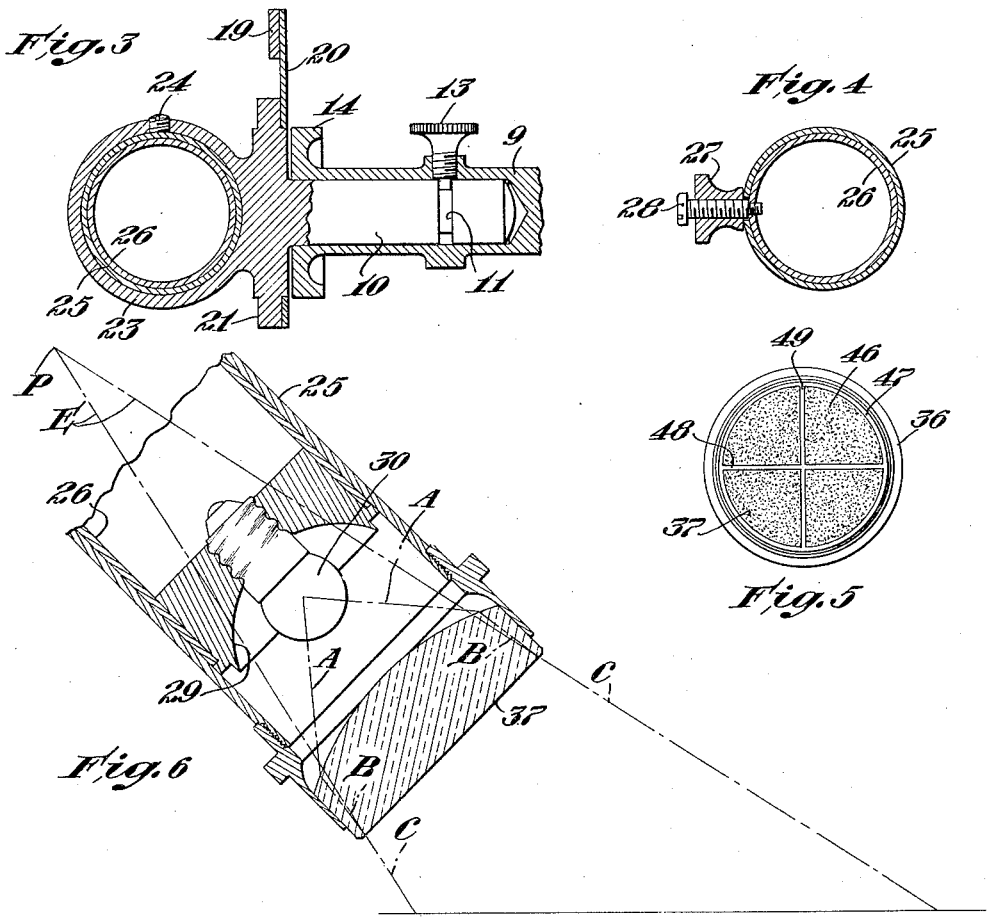
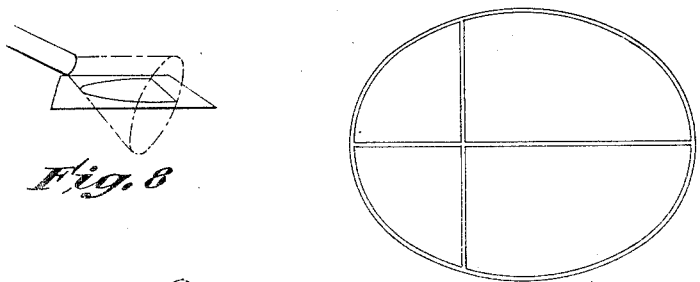
Inventor
Barrett R. Wellington Patented Mar. 2, 1937

2,072,286

UNITED STATES PATENT OFFICE 2,072,286

PROJECTING DEVICE

Barrett R. Wellington, Troy, N. Y.

Application December 7, 1935, Serial No. 53,377

12 Claims. (Cl. 33—46)

This invention relates to a projection device for outlining geometric figures, and particularly various forms of conic sections on a planar surface, thus, for example, to facilitate the drawing or sketching of such figures or to facilitate the cutting of sheet material into pieces having shapes corresponding to figures of this type. The present application is a continuation-in-part of my copending application Serial No. 39,922, filed September 10, 1935.

In accordance with the present invention, a source of light is arranged within a suitable casing so that a cone of light rays is projected therefrom. Thus the casing has a circular light-emitting opening and the light source preferably approximates the nature of a theoretical point; i. e., a bulb with a relatively small, intensely bright filament preferably is employed. The light-projecting instrumentality may resemble the conventional cylindrical flashlight, the cylinder being adjustably mounted so that the longitudinal axis thereof may be disposed at various angles to a planar surface. To permit this desirable result, a suitable adjustable supporting bracket may be provided to support the casing and light source. Such a bracket may be provided with an indicator to show the angular positioning of the casing and the casing itself may be adjustable relative to a tubular hood or shroud to permit effective variation of the apical angle of the light cone. Thus a relatively pointed cone may be defined, if desired, or a cone having a relatively obtuse angled apex. The tubular hood preferably may be associated with the casing in such a manner that a suitable scale may be provided to afford an indication of the angle of the light cone being projected.

If desired, the circular opening through which the light passes may be provided with a shield or lens having an opaque field but provided with a transparent marginal ring. The opaque field of the lens may also, if desired, be provided with transparent lines crossing each other at the center of the transparent circle, these lines preferably being disposed at right angles to each other and one of these lines being disposed in a plane which is perpendicular to the axis about which the casing swings. Thus the casing may be moved to various adjusted positions wherein the light passing through this transparent line of the lens will define a line on the planar surface to bisect the figure being defined by the light passing through the curved transparent margin of the lens.

Preferably the lens may have a form which enhances the intensity of the light rays projected through its transparent ring or border. For this purpose I have found that a lens having a generally convex inner surface is particularly effective. Such a lens may have a flat outer surface. A lens of this form is effective in permitting the device to project a hollow cone of light with an apical angle such as would be provided if the light source were spaced considerably from the lens. Obviously if the light source were actually thus spaced from the lens, the intensity of the light passing through the transparent ring would be materially reduced, but a lens of this type permits the light source or bulb to be disposed relatively close to the lens so that the light intensity may be relatively high, although the light cone has an apical angle such as would be provided if the light were spaced at a much greater distance from the lens.

If desired, an instrument of this type may receive electrical current from a suitable source of supply, as the conventional house lighting line, or such a device may be provided with a battery such as is employed in conventional flashlights. A device of this character may be relatively simple and inexpensive to manufacture and may conveniently be disassembled for shipping or storage, if desired.

In the accompanying drawings:

Fig. 1 is a side elevation of a projecting device constructed in accordance with this invention;

Fig. 2 is a plan view of the same;

Fig. 3 is a vertical section through the pivotal axis, with the cylinder disposed horizontally;

Fig. 4 is a section indicated by line 4—4 of Fig. 1;

Fig. 5 is an elevational view of the lens;

Fig. 6 is an enlarged sectional detail of one end of the casing with the paths of the light rays and cooperating optical factors indicated by dot and dash lines, this figure also showing how an ellipse may be defined by an instrument of this character;

Fig. 7 is a plan view of such an ellipse;

Fig. 8 is a diagrammatic perspective view showing the manner in which a parabola may be defined by an instrument of this character; and Fig. 9 is a similar view showing how a hyperbola may be defined.

The accompanying drawings illustrate a typical embodiment of the present invention and show an instrument provided with an arcuate base I which may have thin cushioning pads 2 to rest on a suitable planar supporting and light-receiving surface. An upstanding rod or upright 4 is secured to the intermediate part of the base 1 and a resilient split ring 7 may be slidably mounted upon this rod, being, however, provided with an adjustable clamping screw 8. The ring 7 supports an outstanding horizontal arm 9, the vertical positioning of which may be varied by sliding the ring 7 upon the rod 4 when the screw 8 has been loosened.

As shown in Fig. 3, the rod 9 is provided with a tubular end portion in which a stub shaft 10 is pivotally received. The shaft 10 may be provided wtih a groove 11, and a thumb screw 13 upon the tubular extension of rod 9 may normally grip this grooved portion of the stub shaft 10 to hold the latter in adjusted angular position and to prevent its movement out of telescoping engagement with the end of rod 9. Preferably the tubular end of rod 9 is provided with an outstanding annular flange 14 to which a pointer arm 15 (Figs. 1 and 2) may be fixed. The outer end of this arm is provided with a pointer registering with graduations upon a scale member 19 which preferably is fixed to a sheet metal member 20 that is secured to the stub shaft 10 and affords an indication of the angular position of the cone axis. The stub shaft 10 has an annular enlargement 21 having an integral extension providing a ring 23 which may be provided with a clamping screw 24 to hold a tubular hood 25 in position.

A casing 26 is slidably mounted within the tube 25. A clamping nut 27 is threaded upon a stud or cap screw 28 fixed to the wall of the casing and extending through a slot 29 in the wall of the tubular hood. Thus when the clamping nut 27 is tightened, the casing is held fixed relative to the tubular hood. The casing 26 may have a general form somewhat resembling that of a conventional flashlight and may, if desired, be provided with dry batteries arranged in the same manner as is common in flashlights. The casing may also have a reflector 29 and a bulb 30 providing a concentrated light source in the form of a small filament. The opposite end of the casing may be provided with any suitable switch means, such means as illustrated being provided with the control knob 33. The end of the tubular shell or hood 25 may be provided with a removable lens holder 36 which normally holds a glass lens 37 upon the end of the hood so that the lens is in effect supported by the casing. The lens preferably has a form causing the intensification of the light received from the light source and passing through the lens. Thus, as shown in Fig. 5, the lens may conveniently have an inner convex surface and an outer planar surface. The outer face of the lens preferably is provided with a generally opaque field, designated by numeral 46. This field may be provided by coating the glass of the lens with suitable paint or lacquer as, for example, a black enamel, or suitable opaque material may be adhesively secured to the surface of the lens. The lens, however, is provided with a narrow transparent marginal ring or border portion 47 and may also be provided with narrow transparent diametric lines 48 and 49 extending at right angles to each other. The transparent line 49 preferably may be arranged so that it is always disposed in a plane which is perpendicular to the pivotal axis defined by rod 9 and stub shaft 10 so that when figures such as ellipses, parabolas and hyperbolas are being defined, the line of light passing through the transparent line 49 on the lens may be effective in bisecting the projected figure.

Preferably the reflector 29 as well as the adjoining wall of the hood 25 may be covered with a black or non-reflective coating and the inner surface of opaque field 46 is also preferably black. Thus aberration is minimized and the light rays received by the lens substantially all come directly from the concentrated light source. The paths of such light rays are indicated particularly in Fig. 6, which illustrates the end portion of the instrument positioned to define an ellipse. Thus, as shown in Fig. 6, the light may pass in straight lines A from the light source to the convex surface of the lens. Thus a light cone having a relatively blunt apical angle is defined within the casing. When the light rays strike the convex surface of the lens, they are turned inwardly at substantial angles, as indicated by lines B in Fig. 6. As the light rays leave the planar surface of the lens and pass through the transparent ring, they turn outwardly at slight angles to the paths B, being disposed in lines C which extend in diverging directions. Extensions E of these lines C would intersect at imaginary point P corresponding to the position of the apparent image of the light source. Thus a hollow cone of light may be projected through the transparent ring 47 of the shield or lens 37, such a cone having a shape similar to that which would be provided if the lens 37 were not provided and if the light source were actually at the point P. Due, however, to the location of the light source much closer to the lens, much greater light intensity results than would be possible were a similar light source actually to be located at the point P. Obviously this is true in the various adjusted positions of the casing and hood 25 which result in the variation of the apical angle of the cone.

In order to permit ready observation of the angle of the cone as thus adjusted, the wall of the casing 26 is provided with graduations or scale means 50 (Figs. 1 and 2) that give a direct reading to show the apical angle of the projected light cone.

Obviously when an instrument of this character is disposed on a suitable planar supporting and light-receiving surface and the axis of the casing is perpendicular to the surface, a circle is projected through the transparent ring 47 of the lens onto the surface. Such a circle is divided into four equal sectors by the lines of light projected through the transparent lines 48 and 49 of the lens.

If the casing is disposed at an angle such as is illustrated in Fig. 6 so that the planar light-receiving surface intersects diametrically opposite rectilinear elements of the cone surface, an ellipse is defined, as diagrammatically indicated in Fig. 7. If the device is adjusted as shown in Fig. 8 so that the light-receiving surface is parallel to the remote rectilinear element of the cone surface, a parabola is projected. On the other hand, if the casing is adjusted as shown in Fig. 9 so that the light-receiving surface diverges from the opposite rectilinear surface of the cone, a hyperbola is projected. In other words, if the angle between the cone axis and planar light-receiving surface exceeds one-half of the apical angle of the cone, the projected figure is an ellipse; if these angles are equal, the projected figure is a parabola; if the angle between the axis and surface is less than one-half of the apical angle, the projected figure is a hyperbola.

It is evident that a device of this character may be employed to facilitate the rapid drawing of figures commonly known as conical sections, such as ellipses, hyperbolas or parabolas, or, if desired, an instrument of this character may be employed to facilitate the cutting of sheet material forming a part of the light-receiving surface, such sheet material being conveniently cut into shapes corresponding to the projected figures. Obviously the vertical adjustment of the ring 7 relative to the rod 9 permits variation in the size of the figure being projected upon the light-receiving surface.

When three points of a desired curve are known, the angle of the casing, the apical angle of the cone, the height of the casing, and the position of the device relative to the three points may be varied until the projected curve is of the proper shape and size to include the three points. It is evident that the scales 19 and 50 greatly facilitate adjustment in this manner.

The arrangement of a shield upon the casing to define a narrow transparent ring permits the instrument more sharply to define the figures that are projected than would otherwise be feasible and greatly facilitates the accurate sketching of the projected figures. It is of course evident that such a shield might be provided having transparent openings of stencil-like form rather than having transparent material, and such a shield is to be regarded as within the purview of the appended claims. The arrangement of the lens to permit intensification of the light emitted through the transparent ring also facilitates the use of this device to permit accurate sketching of the projected figures or cutting of sheet material in the forms thereof.

It is of course evident that the device may be disassembled by removing the ring 7 from the upright 4 and that the energy for producing light may be received from exterior sources such as the conventional house lighting circuit rather than from batteries contained within the casing.

I claim:

1. Projection device comprising a casing, a concentrated light source therein, a shield supported by the casing, said shield having a substantially opaque field and a transparent ring through which light rays from the light source pass to define a hollow cone of light.

2. Projection device comprising a casing, a concentrated light source therein, a shield supported by the casing, said shield having a substantially opaque field and a transparent ring through which light rays from the light source pass to define a hollow cone of light, a bracket supporting said casing, and a tubular hood slidable relative to said casing and carrying said shield, whereby the apical angle of the light cone may be adjustably varied.

3. Projection device comprising a casing, a concentrated light source therein, a shield supported by the casing, said shield having a substantially opaque field and a transparent ring through which light rays from the light source pass to define a hollow cone of light, a bracket supporting said casing, said shield being adjustable relative to said light source, whereby the apical angle of the light cone may be adjusted, and scale means to indicate said apical angle.

4. Projection device comprising a casing, a concentrated light source therein, a shield supported by the casing, said shield having a substantially opaque field and a transparent ring through which light rays from the light source pass to define a hollow cone of light, a bracket having a pivot arranged to support the casing so that it may swing in a vertical plane relative to a supporting and light-receiving surface, and scale means to show the angular position of the casing relative to said surface.

5. Projection device comprising a casing, a concentrated light source therein, a lens supported by the casing, said lens having a substantially opaque field and a transparent ring through which light rays from the light source pass to define a hollow cone of light, said lens having a convex inner surface and a flat outer surface and being effective to enhance the intensity of the light passing through said ring.

6. Projection device comprising a casing, a concentrated light source therein, a lens supported by the casing, said lens having a substantially opaque field and a transparent ring through which light rays from the light source pass to define a hollow cone of light, said lens being optically effective to cause the definition of a light cone having an apical angle such as would be provided by substantial spacing of the light source from the lens while actually permitting the light source to be closer to the lens.

7. Projection device comprising a casing having a round light-emitting opening, a light source disposed within the casing so that a cone of light is emitted through the opening, an adjustable bracket to support the casing, said bracket being constructed and arranged to permit adjustment of the angle of the casing and of the axis of the cone relative to a light-receiving surface, and indicating means associated with the bracket and casing to afford an indication of the angular positioning of the casing and cone.

8. Projection device comprising a casing having a round light-emitting opening, a light source mounted on the casing so that a cone of light is emitted through the opening, and an adjustable bracket to support the casing, said casing having an adjustable portion to permit variation in the apical angle of the light cone being emitted, said casing having scale means to show said angle of the cone.

9. Projection device comprising a casing, a concentrated light source therein, a shield disposed on the casing, said shield having a substantially opaque field and a transparent ring through which light rays from the light source pass to define a hollow cone of light, said shield having crossed transparent lines extending across said opaque field and intersecting at the center of said transparent ring.

10. Projection device comprising a casing, a light source mounted in the casing, an adjustable bracket to support the casing, said bracket permitting the angular adjustment of the casing in a vertical plane, a lens on the casing having a substantially opaque field, a transparent border and a transparent line parallel to said plane and bisecting the opaque field, said lens being arranged so that a hollow cone of light may be defined by light passing through said transparent border and said cone may be bisected by a line of light emitted through said transparent line.

11. Projection device comprising a casing having a concentrated light source and a round light-emitting opening so that a cone of light is emitted through the opening, an adjustable bracket supporting the casing, said bracket being constructed to permit adjustment of the angle of the casing and cone axis relative to a planar light-receiving surface, indicating means having a part on said bracket and a cooperating part movable with said casing to afford a reading of this angle of adjustment, the casing being adjustable to permit variation in the distance of said opening from said source, so that the angle of the cone is varied, and scale means provided by said casing and affording an indication of the angle of the cone, whereby by comparison of the readings of said scale means and indicating means the type of conic section being projected onto the surface can readily be ascertained and whereby a previously projected figure can be duplicated by adjusting the device until the previous readings are duplicated.

12. Projection device comprising a casing, a concentrated light source therein, a lens having a substantially opaque field and a transparent marginal ring through which light rays from the light source pass to define a hollow cone of light, said lens being adjustable relative to said casing and source and being shaped to cause intensification of the light passing through said ring, whereby the apical angle of the intensified light cone may be adjusted, a bracket providing a pivotal connection about which the casing may swing in a vertical plane, scale means indicating the relative adjustment of the lens and light source and consequently the angle of the projected cone, and indicating means to show the angular position of the cone.

BARRETT R. WELLINGTON.